(12) United States Patent
Charpentier et al.

(10) Patent No.: US 10,315,712 B2
(45) Date of Patent: Jun. 11, 2019

(54) SUPPORT DEVICE FOR AN AIR GUIDING MEANS OF A VEHICLE

(71) Applicant: Dr. Ing. h.c. F. Porsche Aktiengesellschaft, Stuttgart (DE)

(72) Inventors: Pierre Charpentier, Stuttgart (DE); Riccardo-Valerio Rume, Esslingen (DE); Martin Siefer, Stuttgart (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 10 days.

(21) Appl. No.: 15/709,483

(22) Filed: Sep. 20, 2017

(65) Prior Publication Data

US 2018/0079456 A1 Mar. 22, 2018

(30) Foreign Application Priority Data

Sep. 22, 2016 (DE) .......................... 10 2016 117 904

(51) Int. Cl.
| | |
|---|---|
| *B60J 9/00* | (2006.01) |
| *B62D 35/00* | (2006.01) |
| *B62D 37/02* | (2006.01) |
| *B60R 11/00* | (2006.01) |

(52) U.S. Cl.
CPC ........... *B62D 35/007* (2013.01); *B62D 37/02* (2013.01); *B60R 2011/004* (2013.01); *B60R 2011/008* (2013.01); *B60R 2011/0045* (2013.01); *Y02T 10/82* (2013.01)

(58) Field of Classification Search
CPC .... A63C 10/24; F16M 13/02; G06K 19/0739; G06K 19/07749; G06K 19/07762; B62D 35/007; B62D 37/02; Y02T 10/82; B01F 3/04049; B60H 2001/3478
USPC ...................................................... 296/180.5
See application file for complete search history.

(56) References Cited

U.S. PATENT DOCUMENTS

| | | | | |
|---|---|---|---|---|
| 4,773,692 A | * | 9/1988 | Schleicher | ........... B62D 35/007 296/180.5 |
| 5,141,281 A | * | 8/1992 | Eger | .................... B62D 35/007 296/180.5 |
| 6,170,904 B1 | * | 1/2001 | Schaedlich | .......... B62D 35/007 296/180.1 |
| 6,805,399 B1 | * | 10/2004 | Brown | .................... B62D 37/02 296/180.1 |
| 7,201,432 B2 | * | 4/2007 | Roth | .................... B62D 35/007 296/180.5 |
| 7,665,796 B2 | * | 2/2010 | Wegener | .............. B62D 35/007 296/180.1 |

(Continued)

*Primary Examiner* — Kiran B Patel
(74) *Attorney, Agent, or Firm* — Leydig, Voit & Mayer, Ltd.

(57) ABSTRACT

A support device for an air guiding means of a vehicle includes a basic body and at least one adjustment device fastened to the basic body, the adjustment device configured to adjust the air guiding means in a Z direction. The at least one adjustment device has at least one adjustment element which is mounted displaceably in a guide device of the adjustment device. The at least one adjustment element has an adjuster for displacing the adjustment element from a first Z position into a second Z position. The at least one adjustment element has a fastening interface for fastening to a drive unit for moving the air guiding means.

10 Claims, 7 Drawing Sheets

(56) References Cited

U.S. PATENT DOCUMENTS

| | | | | |
|---|---|---|---|---|
| 7,735,899 B2* | 6/2010 | Baumeier | ............... | B60J 7/205 |
| | | | | 296/107.08 |
| 8,991,899 B2* | 3/2015 | Wild | ................... | B62D 35/007 |
| | | | | 296/180.5 |
| 9,132,868 B2* | 9/2015 | Shiga | ..................... | B62D 37/02 |
| 10,173,737 B2* | 1/2019 | Weiss | ................... | B62D 29/043 |
| 2002/0125738 A1* | 9/2002 | Pettey | ................. | B62D 35/007 |
| | | | | 296/180.5 |
| 2004/0256885 A1* | 12/2004 | Bui | ..................... | B62D 35/007 |
| | | | | 296/180.5 |
| 2005/0077753 A1* | 4/2005 | Burg | ................... | B62D 35/007 |
| | | | | 296/180.5 |
| 2007/0236046 A1* | 10/2007 | Froeschle | ........... | B62D 35/007 |
| | | | | 296/180.5 |
| 2008/0061596 A1* | 3/2008 | Brown | ...................... | B60T 1/16 |
| | | | | 296/180.1 |
| 2012/0223545 A1* | 9/2012 | Goenueldinc | ....... | B62D 35/007 |
| | | | | 296/180.5 |
| 2013/0068547 A1* | 3/2013 | Wolf | ..................... | B60K 11/04 |
| | | | | 180/68.4 |
| 2015/0375809 A1* | 12/2015 | Yuasa | ................. | B62D 35/007 |
| | | | | 296/180.1 |
| 2016/0059911 A1* | 3/2016 | Shiga | ................. | B62D 35/007 |
| | | | | 296/180.5 |
| 2018/0093718 A1* | 4/2018 | Charpentier | ......... | B62D 35/007 |
| 2018/0134328 A1* | 5/2018 | Yoon | .................... | B62D 35/007 |
| 2018/0134329 A1* | 5/2018 | Cha | ........................ | B62D 37/02 |
| 2018/0134332 A1* | 5/2018 | Cha | ........................ | B62D 37/02 |
| 2018/0215422 A1* | 8/2018 | Hermann | ............... | B62D 35/00 |
| 2018/0215423 A1* | 8/2018 | Hermann | ............. | B62D 35/007 |

* cited by examiner

SUPPORT DEVICE FOR AN AIR GUIDING MEANS OF A VEHICLE

CROSS REFERENCE TO RELATED APPLICATIONS

This application claims benefit to German Patent Application No. DE 10 2016 117 904.3, filed Sep. 22, 2016, which is hereby incorporated by reference herein.

FIELD

The present invention relates to a support device for an air guiding means of a vehicle, and to an adjustment device for such a support device.

BACKGROUND

It is known that vehicles are intended to be provided with air guiding means. These are in particular what are referred to as spoilers. Such air guiding means are frequently designed to be movable between different positions. For example, the rear spoiler of a vehicle is designed to be adjustable between a retracted passive position and an extended active position. In order to be able to carry out the movement between these two different positions, drive units, for example in the form of electric drive motors, are customarily provided. In the retracted passive state of the air guiding means, it is desirable for the latter to be formed flush with the surrounding sheet metal panel of the vehicle. At the same time, the gap sizes with respect to the surrounding sheet metal parts are intended in an advantageous manner to be formed uniformly. In particular in respect of a flush transition to adjacent sheet metal parts of the vehicle, setting of the relative position of the air guiding means in what is referred to as the Z direction is necessary. The air guiding means here is customarily a substantially flat body, the surface of which defines a plane which can be denoted with an extent in an X direction and a Y direction. Arranged perpendicularly to said plane is a Z direction which is of relevance for setting the flush mounting with respect to the adjacent sheet metal part.

SUMMARY

In an embodiment, the present invention provides a support device for an air guiding means of a vehicle. The support device includes a basic body; and at least one adjustment device fastened to the basic body, the adjustment device configured to adjust the spoiler in a Z direction. The at least one adjustment device has at least one adjustment element which is mounted displaceably in a guide device of the adjustment device. The at least one adjustment element has an adjuster for displacing the adjustment element from a first Z position into a second Z position. The at least one adjustment element has a fastening interface for fastening to a drive unit for moving the air guiding means.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

A disadvantage of the known solutions is that support devices are customarily provided on which the air guiding means is fastened. A setting for the air guiding means in the Z direction can then take place with corresponding elongated holes and screw means. However, this is associated with disadvantages since the setting can customarily be carried out only in the extended state of the air guiding device. Checking as to whether the flush mounting has now been achieved can be carried out, however, only in the retracted passive state of the air guiding means. The flush mounting in the Z direction therefore has to be carried out iteratively via repeated retraction and extension of the air guiding means. A further disadvantage is that, because of the regular retraction and extension of the air guiding means during installation for adjusting in the Z direction, the flush mounting in other orientations may also be lost. This leads to an increased outlay on installation and to an extended installation time.

An aspect of the present invention at least partially eliminates the disadvantages described above. In particular, an aspect of the present invention facilitates the installation of an air guiding means on a vehicle in a cost-effective and simple manner. Air guiding means according to embodiments of the invention can be, for example, a spoiler.

Embodiments of the invention provide support devices for an air guiding means of a vehicle. Such a support device has a basic body and at least one adjustment device, which is fastened to the basic body, for adjusting the air guiding means in the Z direction. The at least one adjustment device here has at least one adjustment element which is mounted displaceably in a guide device of the adjustment device. The at least one adjustment element has an adjustment means for displacing the adjustment element from a first Z position into a second Z position. Furthermore, the at least one adjustment element has a fastening interface for fastening to a drive unit for moving the air guiding means.

Embodiments of the invention allow for possibility of adjustment in the support device by the adjustment device. The support device here can both remain passively within the vehicle and can be moved in a preferred manner together with the air guiding means. The air guiding means is therefore supported by the support device such that, with the aid of a drive unit, the air guiding means can be moved together with the support device between the active position and the passive position. As a result of the fact that the relative position of individual components of the adjustment device with respect to one another can now be varied, the relative position of the support device, and therefore of the air guiding means, with respect to the surrounding sheet metal parts can also be varied in the Z direction. Within the context of the present invention, this varying, which can also be referred to as calibrating, is the adjustment or setting in the Z direction. The individual Z positions of the adjustment element are based here on the Z direction, as has been explained in the introductory part of this application. In order to obtain a better overview of the advantages of the present invention, the operation for adjusting the support device is explained in more detail below.

If a vehicle is assembled, the individual sheet metal parts are customarily already assembled or fastened when the support device and the air guiding means are to be adjusted. The air guiding means can already be fastened here on the support device. If the support device and therefore also the air guiding means are now in the passive position, it can be identified where the offset still is in relation to the flush mounting between the adjacent sheet metal parts and the air guiding means. In particular, this can not only involve qualitative checking, but also quantitative determination of the size of the difference in length units that is still opposed to the flush mounting. Subsequently, in the active state, i.e. in the at least partially extended position of the air guiding means, adaptation of said Z position can take place. For this purpose, a movement of the adjustment means takes place. With the aid of the adjustment means, for example by displacement, but in particular by rotation, a relative movement of the adjusting element with respect to a corresponding base body of the adjustment device can be carried out. Said displacing movement is guided with the aid of a guide device, for example in the form of a rear-gripping rail. In other words, by activation by means of the adjustment means, the adjustment element now moves in a displacing manner, for example in the form of a slide, between different Z positions. The different Z positions are accordingly differentiated by different orientations of the adjustment element relative to the adjustment device with respect to the Z axis or the Z direction.

Owing to the fact that the adjustment element provides fastening to the drive unit via a fastening interface, an adjustment with the aid of the adjustment means, and therefore a change of the relative position between the adjustment element, on the one hand, and the adjustment device, on the other hand, also leads to a change of the relative position of the entire support device with respect to the drive unit. This leads in turn to the fact that, by connecting the air guiding means to the support device, the air guiding device also takes up a different Z position with respect to the drive unit. In other words, the air guiding means can now be raised or lowered in the Z direction, and therefore, in particular in the passive state, flush mounting with respect to the adjacent sheet metal parts can be set.

In comparison to the known solutions, this adjustment can now be carried out in a defined and especially guided manner. This guidance relates here in particular to the Z direction, and therefore an undesirable adjustment in other directions no longer impairs the flush mounting in these other directions, but rather the flush mounting which has already been set can remain at other gap positions. In other words, an adjustment possibility is possible in an isolated manner exclusively for the Z direction by means of the adjustment device.

Support devices according to embodiments of the invention make reproducibility of the Z positionings possible. Depending on the choice of the adjustment means, the corresponding adjustment movement can thus correlate with a corresponding Z movement of the entire air guiding means. If, for example, the adjustment screw also described later on is used, it is possible, with a revolution of 360° depending on the thread pitch of said adjustment screw, to predict which result in the Z direction this one revolution of the adjustment screw will afford in respect of the flush mounting with respect to the adjacent sheet metal parts. If, in the retracted state of the air guiding means, the distance opposing the flush mounting with respect to the adjacent sheet metal parts is now determined in a quantitative manner, the size of the difference that has to be overcome by a corresponding number of revolutions and overcoming the thread pitch of the adjustment screw can be quantitatively calculated on the basis of said distance. This leads to the fact that, in a single step after a quantitative determination, the adjustment can be carried out and the flush mounting of the air guiding means with respect to the adjacent sheet metal parts is producible simply, cost-effectively and rapidly in a reproducible manner.

It can be of advantage if, in the case of a support device according to an embodiment of the invention, the guide device has at least one guide slot in which a guide projection of the adjustment element engages for guidance. Two lateral guide slots are preferably provided for each adjustment element, and therefore the adjustment element is arranged and mounted displaceably substantially in the form of a slide between said adjustment slots. In other words, the guide slot, which is formed in particular along a straight line, now serves to provide the guidance functionality. A sliding mounting is preferably set here between guide slot and guide projection, and therefore corresponding sliding surfaces can be set in a manner sliding along one another. This is a particularly simple, cost-effective and especially easy embodiment possibility in order to be able to provide a guidance possibility in a support device.

Furthermore, in support devices according to embodiments of the invention, the adjustment means can have an adjustment thread which engages in a mating thread of the adjustment element. A wide variety of thread forms can be provided under an adjustment thread, in particular, however, that involves a metric thread. An adjustment thread here is in particular the external thread of an adjustment screw as adjustment means which engages in a corresponding internal thread within the adjustment element. This leads to the fact that, as the adjustment movement, a rotational movement of the adjustment means is carried out, and therefore a change of the relative position is provided by a translationally induce movement as a function of said rotational movement. In particular in respect of the general advantage of the present invention of providing reproducibility of a change of the relative position in the Z position, a metric adjustment thread affords great advantages.

It is furthermore of advantage if, in the case of a support device according to an embodiment of the invention, the fastening interface has a fastening means, in particular in the form of fastening screw, for fastening to the drive unit. Such a fastening means, in particular in the form of a fastening screw, leads to the fact that this connection to the drive unit can be undertaken particularly simply, cost-effectively and rapidly. Customarily, drive units are already equipped with corresponding mating fastening interfaces, and therefore, even in the case of existing design solutions for said drive units, a support device according to an embodiment of the invention is now retrofittable. It can readily be seen here that, even in the case of existing design solutions for the air guiding means, the support device and also the connected components in the form of a drive unit, there is a retrofitting possibility for a support device according to an embodiment of the invention.

It is moreover advantageous if, in the case of a support device according to an embodiment of the invention, the fastening axis of the fastening means is oriented transversely, in particular perpendicularly or substantially perpendicularly, with respect to the adjustment axis of the adjustment means. With a corresponding fastening tool, the fastening movement and the adjustment movement can accordingly likewise be carried out in different orientations. Accordingly, in particular the access to the adjustment axis with an adjustment tool is facilitated since a non-parallel design with respect to the fastening axis of the fastening means, said fastening axis customarily being oriented transversely with respect to the direction of the vehicle, now permits easier access to the adjustment means and to a corresponding adjustment interface.

Moreover, it is of advantage if, in the case of a support device according to an embodiment of the invention, the at least one adjustment device has at least two, in particular identical or substantially identical, adjustment elements. This leads to the possibility of an in particular symmetrical configuration of the adjustment device. A symmetrical adjustment can therefore be carried out at the respective adjustment device. The two adjustment elements can be adjustable here both dependently on and independently of each other. It is preferred if each adjustment element has a dedicated adjustment means, and therefore each adjustment element can provide a dedicated setting of a specific Z position independently of each other. Even in the case of complex geometrical outer skin situations of a body of the vehicle, this makes it possible to be able to provide the desired flush mounting with respect to the adjacent sheet metal parts of the vehicle by means of the multiple setting possibility at an individual adjustment device. At the same time, this increased flexibility in the setting possibilities is achieved with a reduced complexity of the entire system.

Furthermore, it is of advantage if, in the case of a support device according to an embodiment of the invention, at least two, in particular identical or substantially identical, adjustment devices, are fastened to the basic body. The adjustment devices are preferably arranged at a distance from each other, in particular at the two end portions of the air guiding device of the support device. It is thus possible to carry out the setting of the Z positions at the two side portions of the air guiding device, i.e. at the left end portion and at the right end portion, independently or substantially independently of one another. This has the effect that, in particular in respect of the necessary manufacturing tolerances during the production of the air guiding means and/or of the support device, it is possible to work with greater tolerance ranges. This in turn has the effect that the manufacturing can be configured in a more cost-effective manner with a lower degree of accuracy. Accordingly, the flush mounting with respect to the adjacent sheet metal parts is no longer achievable by increased manufacturing accuracy, but rather by the simplified adjustment with a support device according to an embodiment of the invention.

It is a further advantage if, in the case of a support device according to an embodiment of the invention, the at least one adjustment element is urged against the adjustment device with a spring force by means of a spring device. This can involve, for example, a spring washer on the opposite side of the fastening means. The action of a spring force results in prestressing of the adjustment element, in particular against the adjustment device and/or the basic body. Said prestressing has the effect that a relative movement in a vibrating or rattling manner is avoided or substantially avoided. Although parts which are movable relative to one another are therefore involved here, a vibration loading of the components or an acoustic loading by such a vibration can be reduced to a minimum or even entirely avoided in a cost-effective and simple manner.

It is likewise advantageous if, in the case of a support device according to an embodiment of the invention, the adjustment means of the at least one adjustment element is locked against the adjustment device with a locking means, in particular with a lock washer. Such a locking means serves to fix the relative position in which the adjustment means is arranged relative to the adjustment device. This makes it possible, in particular in the case of the design of the adjustment means in the form of an adjustment screw, to also actually provide the rotational movement with respect to a change of the relative position of the adjustment element relative to the adjustment device.

The present invention likewise relates to adjustment devices for fastening to a basic body of a support device according to an embodiment of the present invention. For this purpose, the adjustment device has at least one adjustment element which is guided displaceably in a guide device of the adjustment device. The at least one adjustment element is equipped with an adjustment means for displacing the adjustment element from a first Z position into a second Z position. The at least one adjustment element here furthermore has a fastening interface for fastening to a drive unit for moving the air guiding device. By means of the use of an adjustment device according to an embodiment of the invention, the same advantages are achievable for the latter as have been explained with respect to the support devices according to embodiments of the invention.

Figure 1:
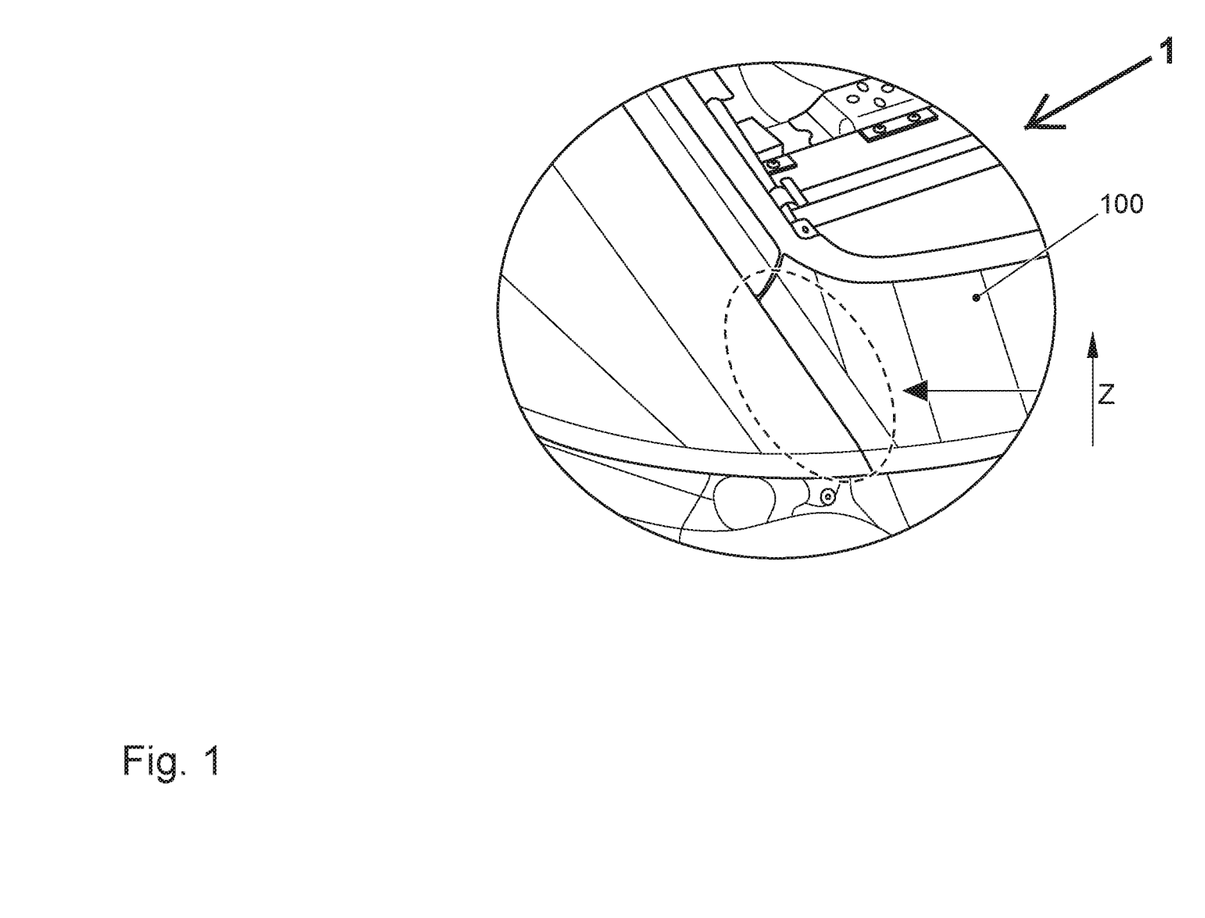
FIG. 1 shows a top view of the flush mounting of an air guiding means.
Figure 7:
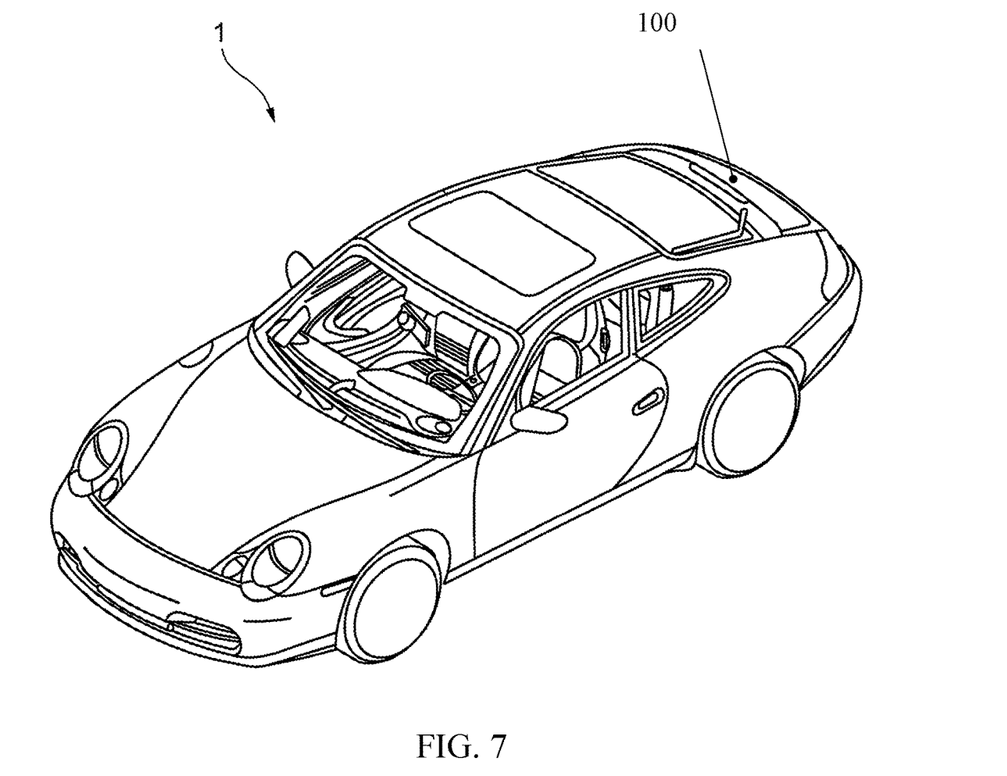
FIG. 7 shows a vehicle with an air guiding means.

FIG. 1 schematically shows how the situation on the sheet metal panel of a vehicle 1 can look. An air guiding means 100 is thus illustrated here, which is depicted in the passive position in FIG. 1. FIG. 7 illustrates an example placement of an airguiding means 100 for a vehicle 1. In said passive or else retracted situation, the air guiding means 100 is intended to merge flush or substantially flush in respect of its surface into the adjacent sheet metal parts, here into the lateral sheet metal panel. In order to ensure this, the air guiding means 100 has to be configured to be settable or adjustable in the Z direction Z illustrated here. This adjustability also has to be ensured if the air guiding means 100 itself can be retracted or extended between different positions.

Figure 2:
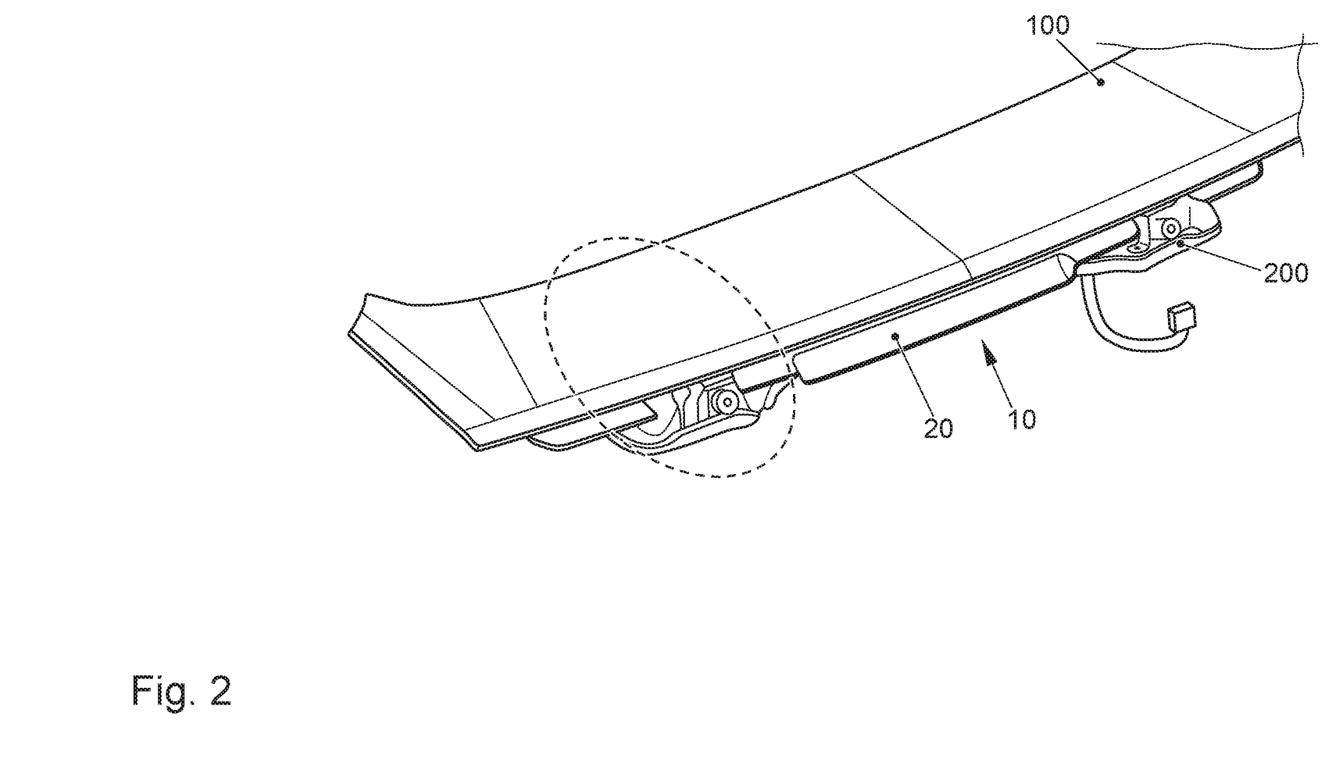
FIG. 2 shows an isolated illustration of the air guiding means according to FIG. 1.
Figure 3:
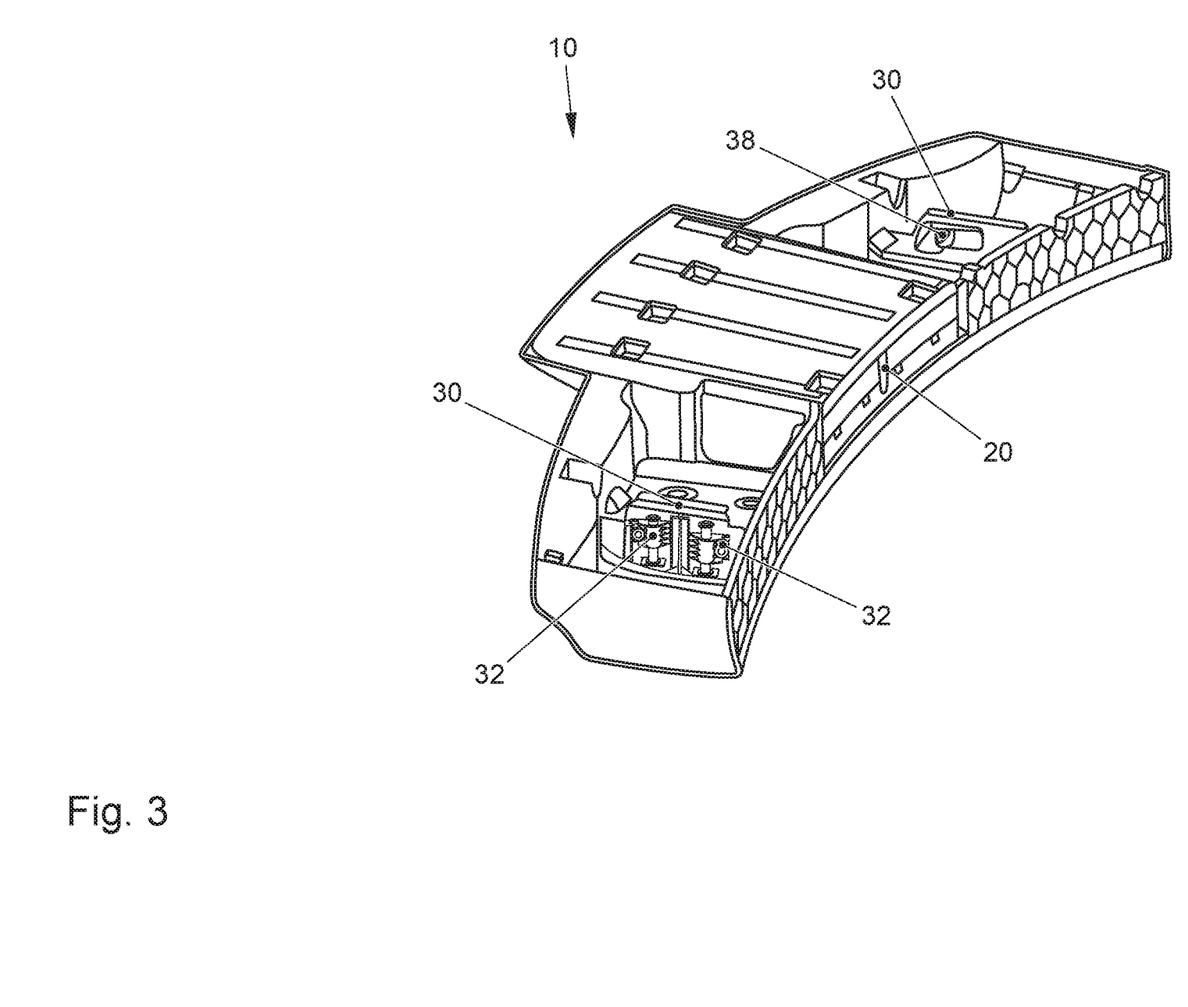
FIG. 3 shows an embodiment of a support device.
Figure 4:
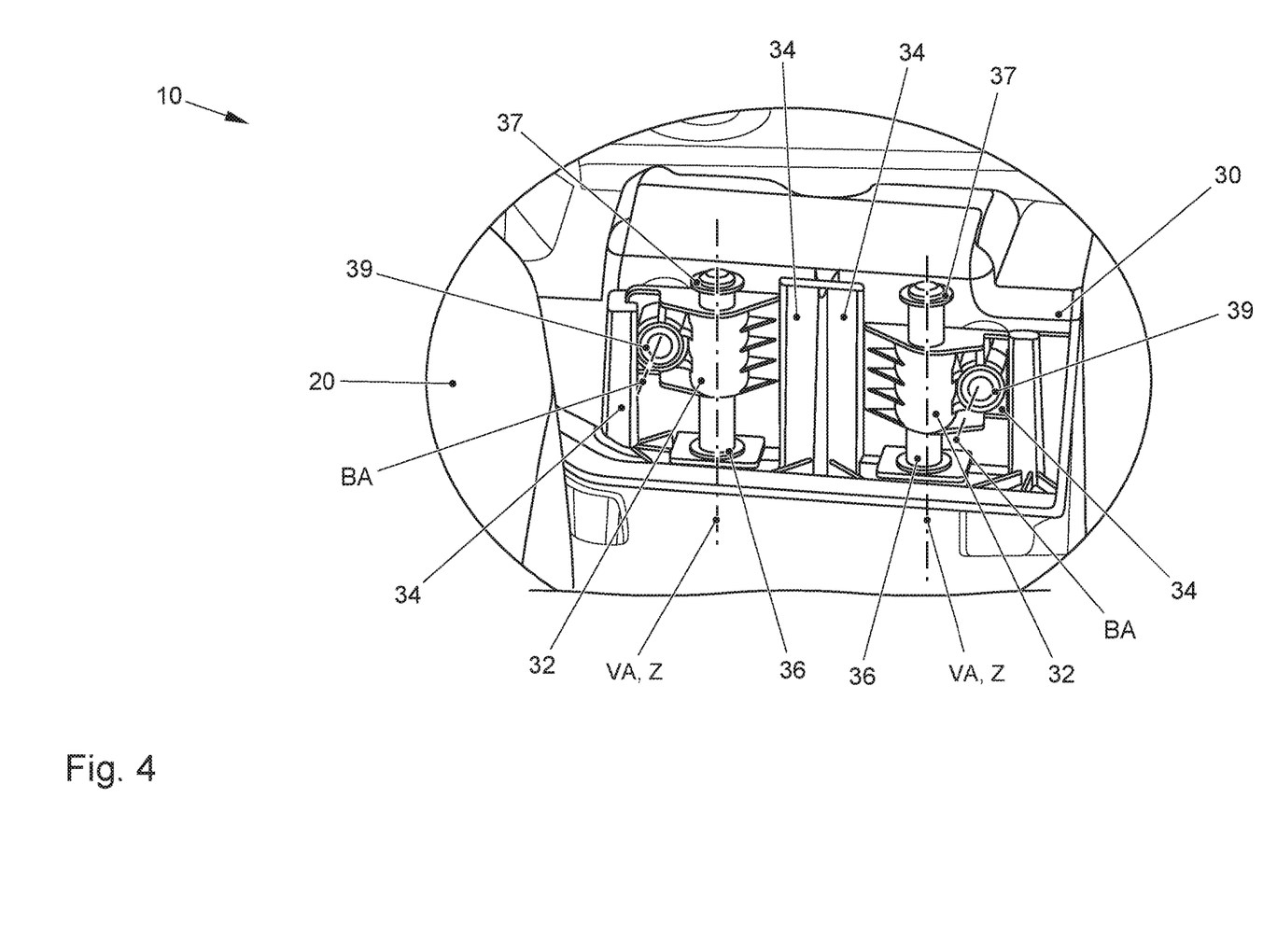
FIG. 4 shows the embodiment of FIG. 3 in a detailed illustration.

FIG. 2 shows how such an active air guiding means 100 can be equipped with a drive unit 200. The drive unit 200 serves to move the air guiding means 100 between the retracted and the extended position. The air guiding means 100 is furthermore connected to a support device 10 which provides a corresponding basic body 20 on the lower side of the air guiding means 100. In this embodiment, the support device 10 is retracted and extended together with the air guiding device 100.

For the setting in the Z direction, a support device 10, as explained in more detail in FIGS. 3 to 6, is now illustrated or provided here for the air guiding means 100. The basic body 20 of the support device 10 is equipped here with two adjustment devices 30 which are arranged on the left and on the right end portion of the basic body 20. Furthermore, each of said adjustment devices 30 is equipped with two adjustment elements 32, as can be readily seen in particular in FIG. 3. These two adjustment elements 32 are designed in the form of slides and engage by means of corresponding guide projections in lateral slots as guide devices 34. If an adjustment in the Z direction is now desired, an adjustment movement can be carried out via a rotational movement about the adjustment axis VA with the adjustment means 36, here the two adjustment screws. Owing to the fact that, with the aid of the locking means 37, the relative position of the adjustment means 36 is unambiguously determined, the rotation of the adjustment means 36 for a movement in the Z direction Z, i.e. up or down in FIG. 4, will take place. Depending on the direction of rotation, the two adjustment elements 32 therefore move upward or downward with respect to the illustration according to FIG. 4.

Figure 5:
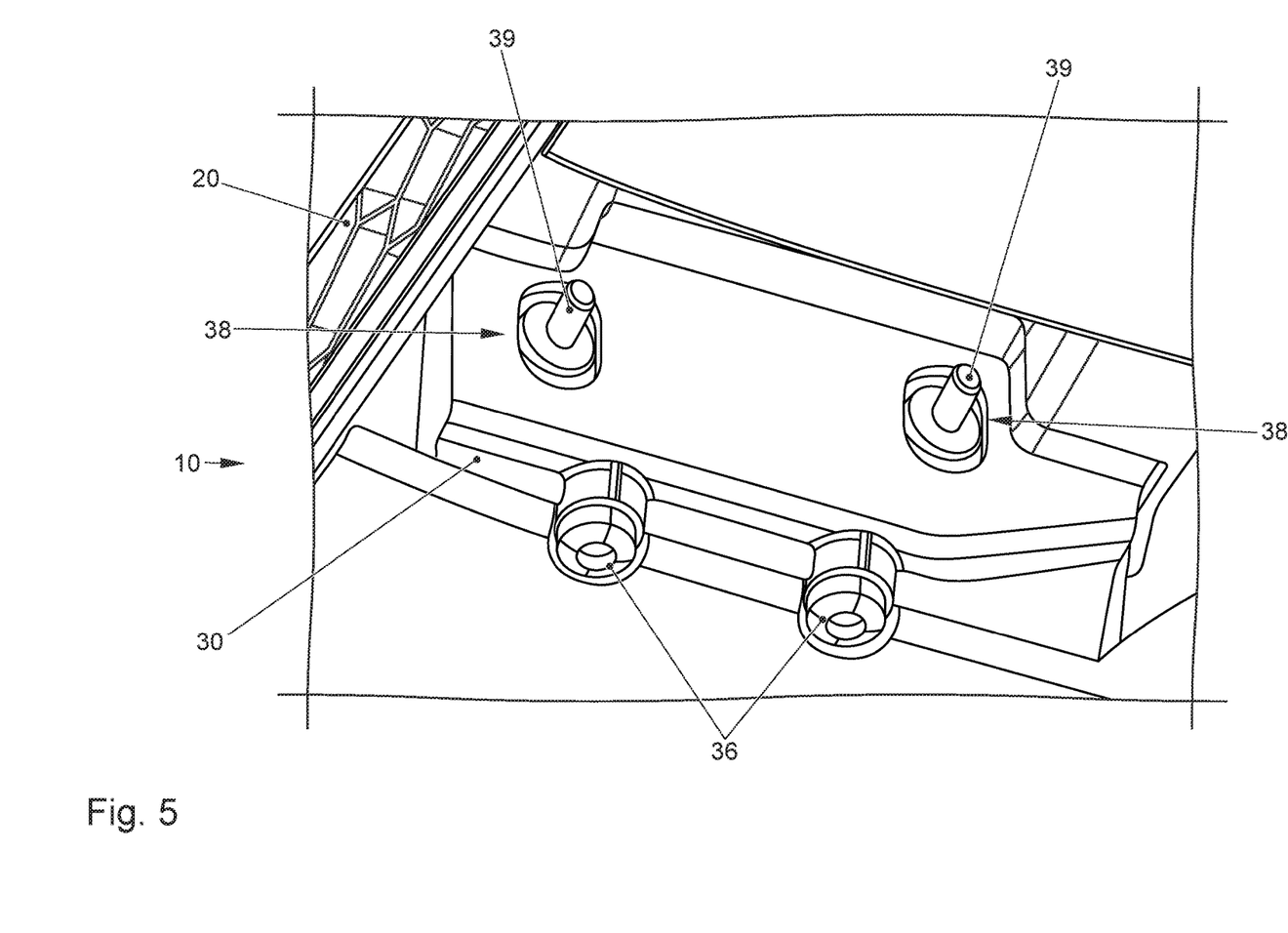
FIG. 5 shows the embodiment of FIGS. 3 and 4 in a detailed illustration.
Figure 6:
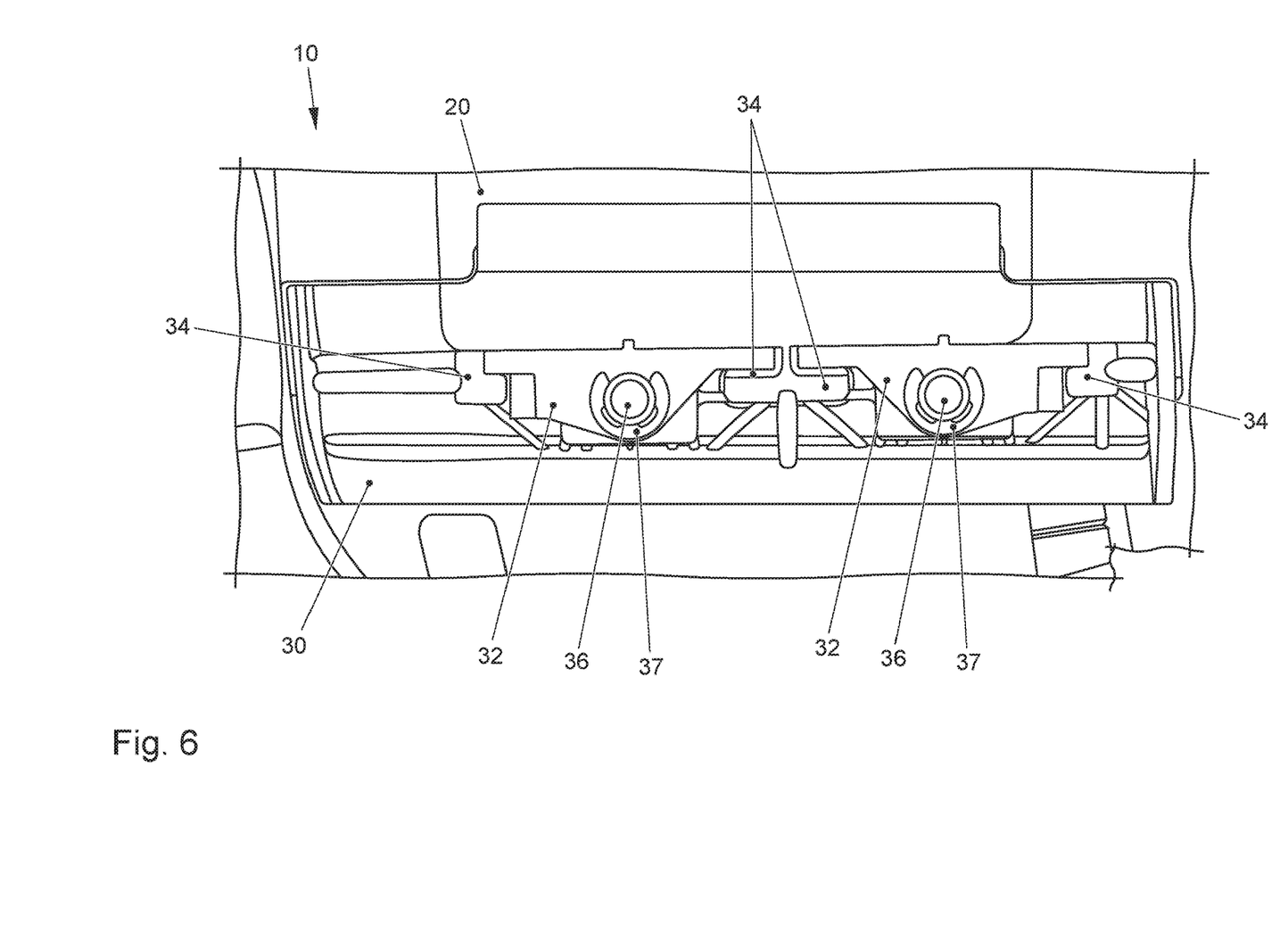
FIG. 6 shows the embodiment of FIGS. 3 to 5 in a further detailed illustration.

In order to carry out this adjustment, an engagement possibility from the lower side is provided by the fact that the two adjustment axes VA are oriented here transversely, in particular perpendicularly, to the two fastening axes BA of fastening means 39. Owing to the fact that not only are the adjustment means 36 provided in the individual adjustment elements 32, but, furthermore, fastening means 39 performing the fastening interfaces 38 are also provided, the relative position with respect to the drive unit 200 is changeable. FIG. 5 shows here how, on the rear side of the adjustment device 30, the two fastening means 39 provide the respective fastening interfaces 38. If the drive unit 20 is in a connected position, by corresponding adjustment and rotation of the adjustment means 36 the air guiding means 100 can now be raised or lowered in the Z direction. In the retracted position according to FIG. 1, the desired flush mounting in the Z direction can therefore be produced simply, cost-effectively and rapidly. FIG. 6 once again shows the top view which in particular permits inspection of the two locking means 37 designed as lock washers.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A support device for an air guiding means of a vehicle, the support device comprising:
    a basic body; and
    at least one adjustment device fastened to the basic body, the adjustment device configured to adjust the air guiding means in a Z direction,
    wherein the at least one adjustment device has at least one adjustment element which is mounted displaceably in a guide device of the adjustment device,
    wherein the at least one adjustment element has an adjuster for displacing the adjustment element from a first Z position into a second Z position, and
    wherein the at least one adjustment element has a fastening interface for fastening to a drive unit for moving the air guiding means.

2. The support device as claimed in claim 1, wherein the guide device has at least one guide slot in which a guide projection of the adjustment element engages for guidance.

3. The support device as claimed in claim 1, wherein the adjuster has an adjustment thread which engages in a mating thread of the adjustment element.

4. The support device as claimed in claim 1, wherein the fastening interface has a fastening screw for fastening to the drive unit.

5. The support device as claimed in claim 4, wherein a fastening axis of the fastening screw is oriented transversely with respect to an adjustment axis of the adjuster.

6. The support device as claimed in claim 1, wherein the at least one adjustment device has at least two substantially identical adjustment elements.

7. The support device as claimed in claim 1, wherein at least two substantially identical adjustment devices are fastened to the basic body.

8. The support device as claimed in claim 1, wherein the at least one adjustment element is urged against the adjustment device with a spring force exerted by a spring device.

9. The support device as claimed in claim 1, wherein the adjuster of the at least one adjustment element is locked against the adjustment device with a lock washer.

10. An adjustment device for fastening to a basic body of a support device for an air guiding means of a vehicle, the support device including a basic body, the adjustment device comprising:
    at least one adjustment element which is mounted displaceably in a guide device of the adjustment device, wherein the at least one adjustment element has an adjuster for displacing the adjustment element from a first Z position into a second Z position, wherein the at least one adjustment element furthermore has a fastening interface for fastening to a drive unit for moving the air guiding means.

* * * * *